United States Patent [19]
Bojas et al.

[11] Patent Number: 5,314,048
[45] Date of Patent: May 24, 1994

[54] REDUCED COST VISCOUS COUPLING BY-PASS ELEMENT FOR A TORQUE CONVERTER

[75] Inventors: Edward J. Bojas, Marshall; Robert J. Kyle; Leo M. Weeks, both of Battle Creek, all of Mich.

[73] Assignee: Eaton Corporation, Cleveland, Ohio

[21] Appl. No.: 993,221

[22] Filed: Dec. 18, 1992

Related U.S. Application Data

[63] Continuation-in-part of Ser. No. 853,560, Mar. 18, 1992, Pat. No. 5,172,796.

[51] Int. Cl.⁵ .............. F16H 45/02; F16D 35/00; F16D 47/06
[52] U.S. Cl. .................... 192/3.29; 192/57; 192/58 B; 29/434; 29/889.5
[58] Field of Search .......... 192/3.29, 3.28, 57, 192/48.3, 58 B, 58 C, 70.16; 464/24; 29/434, 889.5

[56] References Cited

U.S. PATENT DOCUMENTS

| | | | |
|---|---|---|---|
| 2,901,074 | 8/1959 | Badin | 192/58 B |
| 3,404,832 | 10/1968 | Sutaruk | 192/58 B X |
| 4,058,027 | 11/1977 | Webb | 192/57 X |
| 4,496,034 | 1/1985 | Bopp | 192/3.28 |
| 5,044,477 | 9/1991 | Bojas et al. | 192/58 B X |
| 5,172,796 | 12/1992 | Campbell et al. | 192/3.29 |

FOREIGN PATENT DOCUMENTS 2235272 2/1991 United Kingdom ............ 192/58 B

Primary Examiner—Rodney H. Bonck
Attorney, Agent, or Firm—L. J. Kasper

[57] ABSTRACT

A viscous coupling (11) is disclosed of the type used as a by-pass element in a torque converter assembly (T) including a torque converter housing (H) and an output shaft (S). The coupling includes a body member (13), a cover member (15), and an annular clutch assembly (19). The clutch assembly includes a pair of clutch plates (53 and 57), riveted to a mounting portion (37), and the coupling housing includes a housing plate (59), disposed between the clutch plates. The housing plate (59) has an outer portion (61) which is fixed between the body and cover members, by means of tabs (65) engaging the body member (13) and tabs (69) engaging the cover member (15). Preferably, the tabs (65) are received in recesses (67) to prevent relative rotation of the housing plate (59) and body member (13). Also disclosed is an assembly and fluid fill method which eliminates the need for fill holes and plugs or balls being pressed into the fill holes. The disclosed coupling requires substantially less machining than prior art viscous couplings, and therefore, has substantially reduced manufacturing cost.

23 Claims, 3 Drawing Sheets

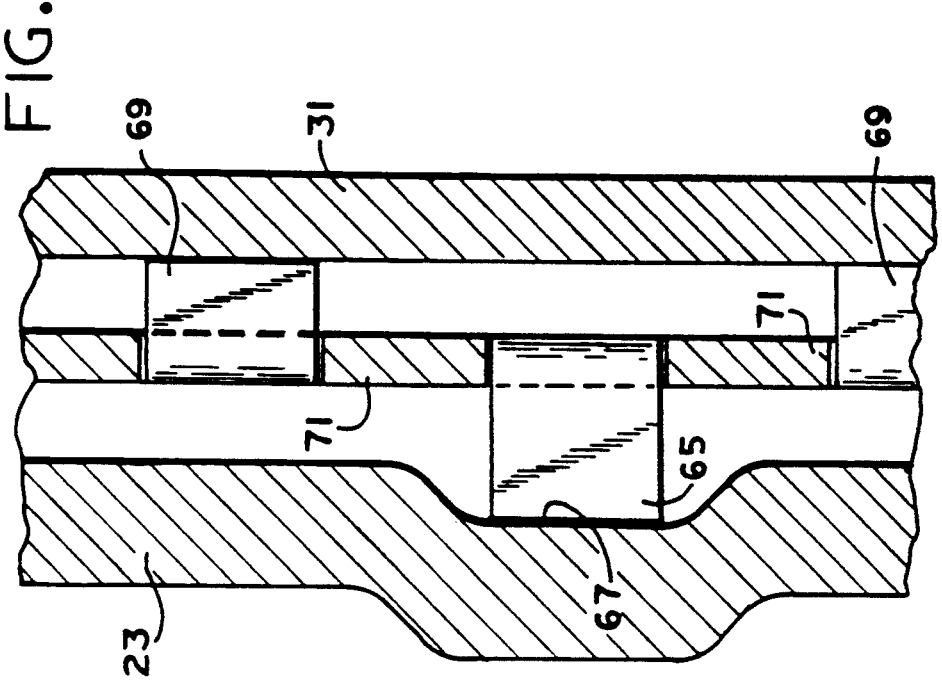
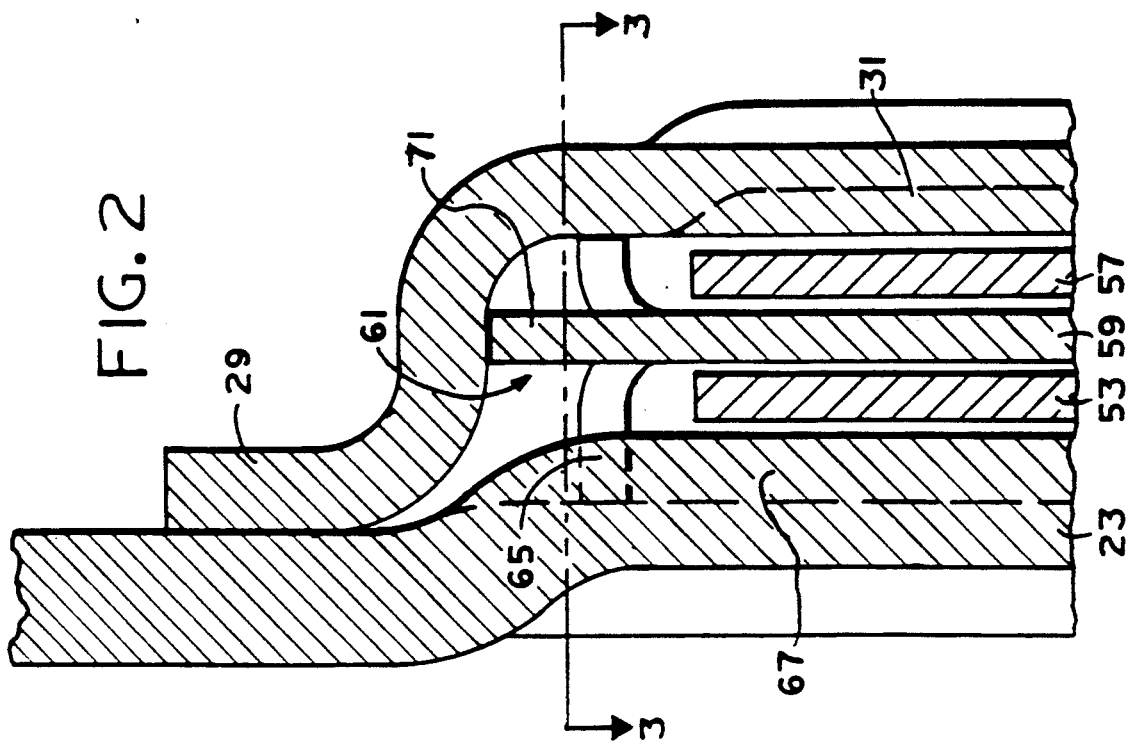

REDUCED COST VISCOUS COUPLING BY-PASS ELEMENT FOR A TORQUE CONVERTER

CROSS REFERENCE TO RELATED APPLICATION

This application is a continuation-in-part (CIP) of co-pending U.S. application Ser. No. 853,560, filed Mar. 18, 1992 in the names of Lester R. Campbell, Edward J. Goscenski, and Edward J. Bojas, for a "REDUCED COST VISCOUS COUPLING BY-PASS ELEMENT FOR A TORQUE CONVERTER", now U.S. Pat. No. 5,172,796.

BACKGROUND OF THE DISCLOSURE

The present invention relates to viscous couplings, and more particularly, to such couplings of the type which are now employed in automatic transmission torque converters, to serve as by-pass elements, by-passing the torque converter.

Torque converter type automatic transmissions have achieved widespread application and acceptance in motor vehicles. Although generally satisfactory in this application, torque converter type automatic transmissions inherently involve a certain amount of slippage, and therefore, inherently result in losses in vehicle fuel economy. In an effort to minimize such slippage, and thereby increase fuel economy, efforts have been made to by-pass the torque converter with some type of relatively direct drive, which typically is activated when the vehicle is operating in the higher gear ratios, and above a predetermine vehicle speed. Although the term "by-pass" is used in regard to this type of element, those skilled in the art will understand that the element is actually transmitting torque in parallel with the torque converter.

While such prior art direct drive by-pass arrangements have resulted in improvements in fuel economy, certain types of by-pass elements utilized have, under certain operating conditions, transmitted various driveline vibrations to the passenger compartment of the vehicles, causing degradation of the ride quality of the vehicle.

In an effort to provide a by-pass element which would not transmit driveline vibration to the passenger compartment, those skilled in the art have utilized a viscous coupling as the by-pass element. Although the use of a viscous coupling as the by-pass element does serve to minimize the transmission of driveline vibration, it is still important that the coupling be designed for maximum durability and, at the same time, be reliable and inexpensive to manufacture.

A typical prior art viscous coupling of the type to which the present invention relates is illustrated and described in U.S. Pat. No. 5,044,477, assigned to the assignee of the present invention, and incorporated herein by reference. Such couplings typically include a cast aluminum body or sidewall member, and a cast aluminum clutch member. Each of these cast aluminum members is then machined to define a plurality of annular, concentric lands and grooves, arranged so that the lands and grooves of the body and clutch are interdigitated, upon assembly thereof, to define a serpentine-shaped viscous shear space. During operation, the shear space is filled with viscous fluid, which is typically a silicone fluid, such that rotation of the body member transmits torque to the clutch member by means of viscous shear drag, as is now well known to those skilled in the viscous coupling art.

Although viscous couplings of the type described above have been quite satisfactory in operation as torque converter by-pass elements, the necessity of machining lands and grooves in both the body and clutch members has added substantially to the manufacturing cost of such couplings. One result has been a somewhat limited market application, i.e., it has not been economically feasible to utilize such viscous couplings in all automatic transmissions requiring torque converter by-pass elements.

SUMMARY OF THE INVENTION

Accordingly, it is an object of the present invention to provide a viscous coupling for use as the by-pass element of a torque converter-type (fluid coupling type) automatic transmission, wherein the viscous coupling design substantially reduces the amount of machining required, and the resultant manufacturing cost.

The above and other objects of the invention are accomplished by the provision of a viscous coupling for use as a by-pass element in torque converter assembly including a torque converter housing and an output shaft. The viscous coupling is of the type including an annular housing assembly adapted to be positioned within the torque converter housing, and having axially spaced, radially-extending first and second annular sidewall members defining an annular viscous chamber therebetween, adapted to contain viscous fluid. The annular housing assembly defines a radially-extending annular clutching surface adapted for clutching co-action with a confronting surface of the torque converter housing. An annular clutch assembly is disposed within the viscous chamber and includes an annular, radially-extending clutch portion adapted for viscous clutching co-action with one of the first and second sidewall members, and an axially-extending clutch hub portion adapted to be drivingly associated with the output shaft of the torque converter assembly.

The improved viscous coupling is characterized by the annular clutch assembly including first and second annular, radially-extending clutch plates disposed adjacent, and adapted for viscous clutching co-action with, an adjacent surface of the first and second annular sidewall members, respectively. The first and second clutch plates are drivingly associated with the axially-extending clutch hub portion, whereby rotation of the clutch plates results in rotation of the clutch hub portion. The annular housing assembly further comprises an annular, radially-extending housing plate disposed axially between the first and second clutch plates, and adapted for viscous clutching co-action with at least one of the first and second clutch plates. The housing plate includes a first plurality of portions in operable engagement with the first annular sidewall member, and a second plurality of portions in operable engagement with the second annular sidewall member.

BRIEF DESCRIPTION OF THE DRAWINGS

FIG. 2 is an enlarged, fragmentary, axial cross-section, similar to FIG. 1, illustrating one aspect of the present invention.

FIG. 3 is an enlarged, fragmentary, transverse cross-section, taken on line 3—3 of FIG. 2, and on the same scale as FIG. 2.

DESCRIPTION OF THE PREFERRED EMBODIMENTS

Figure 1:
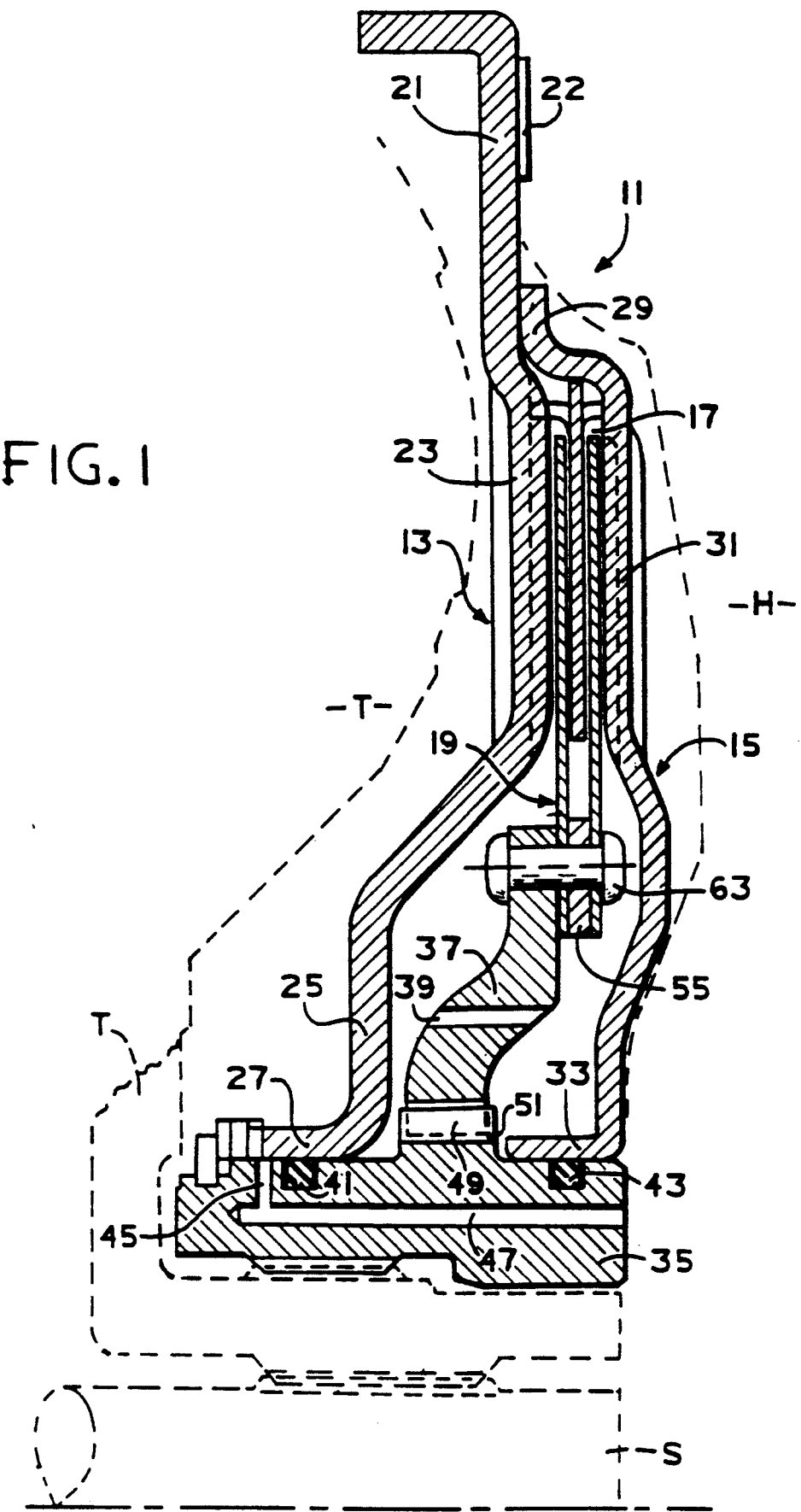
FIG. 1 is an axial cross-section, illustrating the upper half of a viscous coupling by-pass element made in accordance with the present invention.

Referring now to the drawings, which are not intended to limit the invention, there is illustrated in FIG. 1 a viscous coupling, generally designated 11, which serves as a by-pass element in a torque converter assembly. The assembly includes a torque converter housing H, a torque converter T, and a torque converter output shaft S. The viscous coupling 11 is effective, when actuated, to provide a direct drive from the input of the torque converter housing H to the torque converter output shaft S, thus by-passing the high slippage drive path through the torque converter T.

Referring still to FIG. 1, the viscous coupling 11 of the type to which the present invention relates is generally annular, and generally planar, and is of a "sandwich" construction. The viscous coupling includes an annular housing assembly, adapted to be positioned between the torque converter T and the torque converter housing H, and having axially-spaced, annular sidewall members defining an annular clutch chamber therebetween, with an annular clutch assembly being disposed within the clutch chamber.

More specifically, one sidewall of the annular housing is constituted by a body member 13, and the other sidewall of the annular housing is constituted by a cover member 15. The body member 13 and the cover member 15 cooperate to define an annular viscous clutch chamber 17, and a clutch assembly, generally designated 19, is disposed within the clutch chamber 17. The body member 13 and the cover member 15 are preferably formed as steel stampings, while the clutch assembly 19 will be described in greater detail subsequently.

The body member 13 includes a radially outer peripheral portion 21, which includes on its forward surface (right side in FIG. 1) an annular ring of friction material 22, disposed to engage an adjacent surface of the torque converter housing H. The body member 13 further includes an intermediate sidewall portion 23, and an inner, reservoir-defining portion 25 which terminates in an axially-extending sidewall (body) hub portion 27. The cover member 15 includes a radially outer peripheral portion 29 which is attached to the intermediate sidewall portion 23 in a manner to be described subsequently. The cover member 15 further includes an intermediate sidewall portion 31, and a radially inner portion terminating in an axially-extending sidewall (cover) hub portion 33.

The clutch assembly 19 includes an annular, axially-extending clutch hub portion 35, and a generally radially-extending mounting portion 37. The mounting portion 37 preferably defines a plurality of fluid openings 39, the function of which is to permit the movement of viscous fluid from one side of the clutch assembly 19 to the other side thereof. The clutch hub portion 35 defines an upstream annular groove in which is disposed a seal 41, and a downstream annular groove in which is disposed a seal 43. The terms "upstream" and "downstream" will be understood by those skilled in the art to refer to the fact that ATF (Automatic Transmission Fluid) at relatively higher pressure is applied to the chamber between the body member 13 and the torque converter T when it is desired to apply the coupling 11, whereas relatively lower pressure ATF is applied in the chamber between the cover member 15 and the housing H when it is desired to disengage the coupling 11. Therefore, the terms "upstream" and "downstream" refer to the fact that the normal flow of ATF would be from left to right in FIG. 1.

The clutch hub portion 35 further defines an annular leakage groove 45, disposed upstream from the seal 41. The groove 45 is in open communication with an axial passage 47. As is well known to those skilled in the art, it is imperative to prevent any mixing of the ATF from the torque converter T with the viscous fluid within the viscous coupling 11. Therefore, any pressurized ATF which leaks between the outer surface of the hub portion 35 and the inner surface of the hub portion 27 is collected in the leakage groove 45, and communicated from there to the downstream chamber through the passage 47. This construction is also illustrated and described in detail in above-incorporated U.S. Pat. No. 5,044,477. Some flow of ATF through the groove 45 and passage 47 is actually desirable, because such flow conducts heat away from the viscous coupling 11.

Referring still to FIG. 1, the mounting portion 37 of the clutch assembly 19 defines a set of internal splines 49, in splined engagement with a set of external splines 51 defined by the hub portion 35. In face-to-face engagement with the forward (right in FIG. 1) surface of the mounting portion 37 is a clutch plate 53. Disposed adjacent the clutch plate 53 is a spacer member 55, which may comprise either a single, annular ring member, or a plurality of individual pieces. In face-to-face engagement with the spacer member 55 is a clutch plate 57. Disposed axially between the clutch plates 53 and 57, but not normally having any contact or engagement therewith during operation, is a housing plate 59 which will be described in greater detail subsequently.

Referring now primarily to FIGS. 2 and 3, the housing plate 59 includes a radially outer portion, generally designated 61 which is preferably rigidly fixed between the sidewall portion 23 of the body member 13 and the sidewall portion 31 of the cover member 15. It is an important aspect of the present invention that the engagement of the outer portion 61 with the body member 13 and cover member 15 be able to satisfy certain criteria. Therefore, as used hereinafter and in the appended claims, the term "operable engagement" in regard to the outer portion 61 will be understood to mean an attachment which is capable of transmitting torque of the type associated with such coupling devices, and is relatively inexpensive to manufacture.

As was mentioned in the background of the specification, one of the objects of the present invention is to provide a reduced cost viscous coupling. Therefore, it is one important feature of the present invention that the clutch plates 53 and 57, and the housing plate 59, can all be formed in a manner not requiring any machining, or any other substantial amount of processing of any type. In addition, the body member 13 and cover member 15 may also be formed in a manner not requiring any additional machining. By way of example only, the various plates 53, 57, and 59, and the members 13 and 15 may all be steel stampings. As may best be seen in FIG. 1, the clutch plate 53, the spacer member 55, and the clutch plate 57 are all attached to the mounting portion 37, and in tight engagement therewith, by means of a plurality of rivets 63 (only one of which is shown in FIG. 1).

Referring still primarily to FIG. 1, it may be seen that the radially inner extent of the housing plate 59 is not attached to, or supported by any other structure. However, the overall annular shape and the relative rigidity of the plate 59 will tend to ensure that the plate 59 maintains its desired axial position between the sidewall portion 23 and the sidewall portion 31. In addition, the clutch plates 53 and 57 are axially movable by virtue of the engagement of the internal splines 49 to the external splines 51 and, as is well known in the art, when the chamber 17 is substantially filled with viscous fluid and the coupling 11 is rotating, the clutch plates 53 and 57 will tend to center themselves between the adjacent "housing surfaces". As used herein, the term "housing surfaces" refers to the shear surfaces defined by any portion of the housing assembly comprising the body member 13, the housing plate 59, and the cover member 15. In the same manner, the term "clutch surfaces" refers to the shear surfaces defined on either side of the clutch plates 53 and 57.

Referring again primarily to FIGS. 2 and 3, the radially outer portion 61 will be described in greater detail. By way of example only, with the housing plate 59 generally comprising a flat, stamped plate, the radially outer portion 61 may comprise a plurality of tabs, formed either during the initial stamping process, in a subsequent stamping step or other suitable step. A plurality of axially-extending tabs 65 (only one of which is shown in FIG. 3) extends rearwardly (to the left in FIGS. 2 and 3). Each of the tabs 65 is received in a radially-extending recess or groove 67, preferably formed during the stamping of the body member 13. The outer portion 61 also includes a plurality of axially-extending tabs 69 (two of which are shown in FIG. 3). The tabs 69 extend forwardly (to the right in FIGS. 2 and 3), and merely engage in inner surface of the sidewall portion 31. Finally, the outer portion 61 comprises a plurality of radially-extending tabs 71, which merely comprise the remainder of the plate 59, after the tabs 65 and 69 are stamped out and bent axially toward the rear and the front, respectively. In the particular configuration of the subject embodiment, the tabs 71 serve to substantially prevent, or at least minimize, radial movement of the housing plate 59.

It is one significant feature of the present invention that the tabs 65 and 69 are dimensioned such that, when the peripheral portion 29 of the cover 15 is attached to the body 13, the end surfaces of the tabs 65 and 69 will be in tight engagement with the adjacent surfaces of the recess 67 and sidewall portion 31, respectively. As a result, the housing plate 59 is "trapped" in the position shown in FIGS. 2 and 3, and prevented from any substantial axial movement. In addition, the engagement of the tabs 65 within the recesses 67 forces the housing plate 59 to rotate with the assembly of the body 13 and cover 15, thus transmitting torque to the clutch assembly 19. It is not essential that all of the tabs 65 engage recesses 67, but instead, a number of the tabs 65 could have approximately the same axial length as the tabs 69, and engage the inner surface of the sidewall portion 23, in the same manner as the tabs 69 engage the inner surface of the sidewall portion 31. Thus, it may be seen that the object of the present invention is accomplished by providing a viscous coupling in which torque capacity may be increased with the addition of the housing plate 59, but without the need for any additional parts, or any machining of any of the parts, or any complicated or difficult assembly.

ASSEMBLY METHOD

Figure 4:
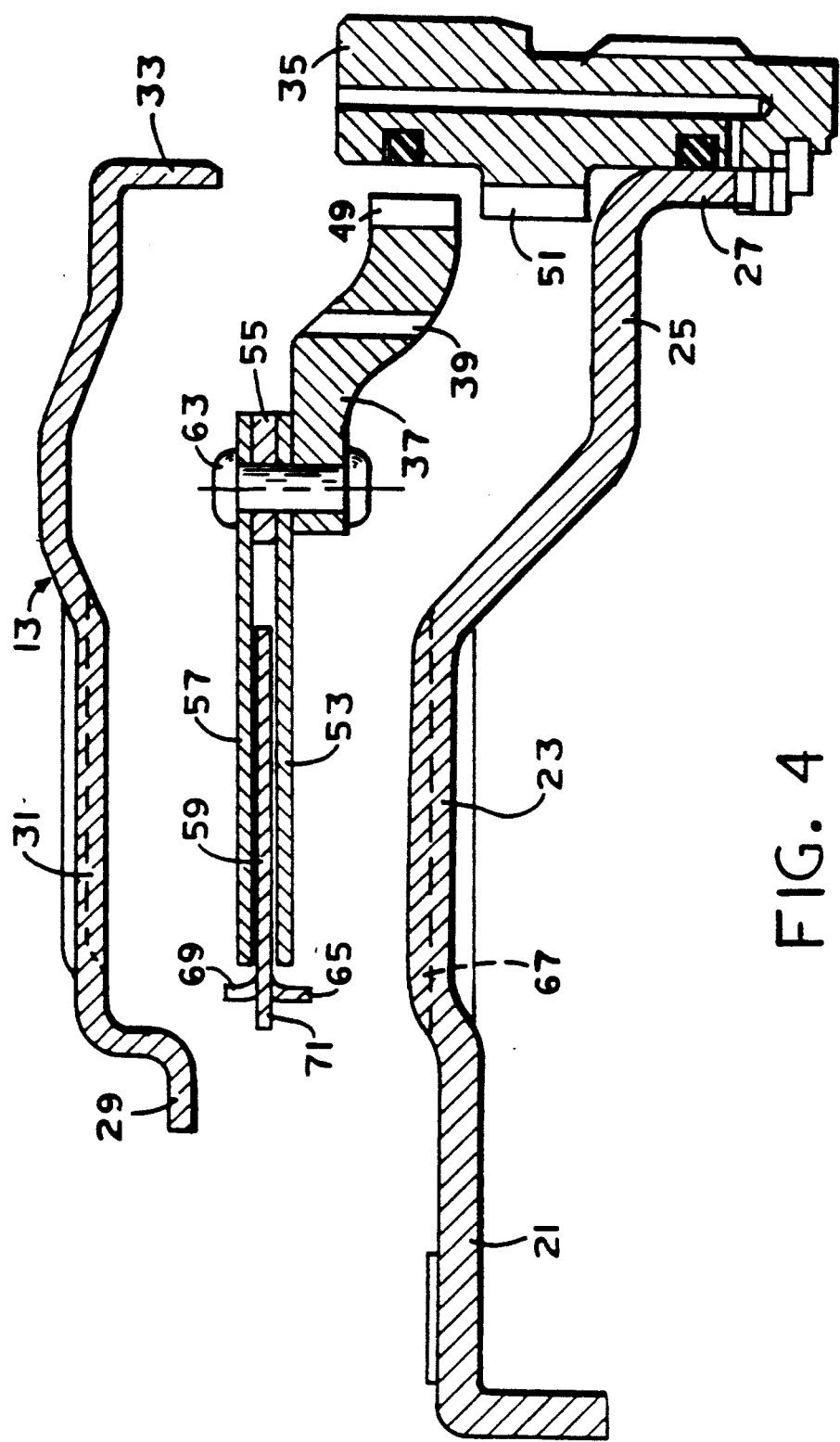
FIG. 4 is a somewhat diagrammatic view, illustrating the method of assembly of the viscous coupling, in accordance with the present invention.

Referring now to FIG. 4, another important aspect of the present invention which will be described is the method of assembling and filling the viscous coupling 11. As is known by those skilled in the art, the prior art viscous couplings of the type for use as torque converter by-pass elements have typically had one or more fill-holes through which the viscous fluid was injected after complete assembly of the coupling. Such an arrangement limits the rate of fill of the coupling and necessitates pressing a ball or plug into each of the holes, after filling is complete, to prevent any leakage of fluid out of the fill holes during operation. The prior art arrangement necessitates the additional machining of the fill holes, the installation of the plugs or balls, and still has been known to result in fluid leakage on occasion.

In accordance with the present invention, but by way of example only, the assembly of the viscous coupling 11 is accomplished by placing the body member 13 in the position shown in FIG. 4, and then inserting the clutch hub 35 within the cylindrical hub portion 27, and in sealing engagement therewith. Subsequently, a subassembly is formed, comprising the mounting portion 37, the clutch plate 53, the spacer member 55, the housing plate 59, the clutch plate 57, and the rivets 63. This subassembly is then lowered into position with the internal splines 49 engaging the external splines 51, and the tabs 65 disposed in the recesses 67, and in engagement with the surface thereof.

Referring still to FIG. 4, after the above-described subassembly has been put into position, the viscous fluid may be introduced into the reservoir, through the fluid openings 39. Depending upon the configuration of the coupling and the total amount of fluid required, fluid may also be placed in the chamber above the mounting portion 37. It is not an essential feature that the fluid filling occur after all of the plates are in position, but it is considered preferable. One reason is that, especially if the fluid fill level is fairly high, fluid will begin to flow radially outward after the filling is completed. However, it is undesirable to have fluid in the region of the outer portion 61 during the final step of assembly, which is attaching the cover member 15. Therefore, it is preferable to perform the filling after all plates are in position, and then immediately install the cover member 15.

After the coupling is filled with viscous fluid, the cover member 15 is brought into position with the cylindrical hub portion 33 surrounding the hub portion 35, and in tight sealing engagement therewith. When the cover member 15 is thus positioned, the peripheral portion 29 will be in engagement with body member 13, but only in loose engagement. The final step of the assembly and filling method is the attachment of the portion 29 to the sidewall portion 23 of the body member 13. Preferably, this is accomplished by means of electron beam welding, or some other suitable and permanent method of attachment, whereby the portion 29 and the body member 13 are in fixed engagement.

It should be apparent to those skilled in the art that, in the event even greater torque-transmitting capability is required, there could be added at least one additional clutch plate, one additional spacer member, and one additional housing plate. In such case, the forwardly-extending tabs on the housing plate 59 would engaged the second housing plate, and it would probably be desirable for the forwardly-extending tabs on the second housing plate to engage some sort of recess in the cover member, similar to the recess 67 shown in FIG. 3. It may also be desirable for the tabs on each housing plate which extend toward the other housing plate to have some additional means for preventing relative rotation between the housing plates.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A viscous coupling for use as a bypass element in a torque converter assembly (T) including a torque converter housing (H) and an output shaft (S); said viscous coupling being of the type including an annular housing assembly adapted to be positioned within the torque converter housing, and having axially spaced, radially-extending first and second annular side wall members defining an annular viscous chamber therebetween adapted to contain viscous fluid; said annular housing assembly defining a radially-extending annular clutching surface adapted for clutching co-action with a confronting surface of the torque converter housing (H); an annular clutch assembly disposed within said viscous chamber and including an annular, radially-extending clutch portion adapted for viscous clutching co-action with one of said first and second side wall members, and an axially-extending clutch hub portion adapted to be drivingly associated with the output shaft (S) of the torque converter assembly; characterized by:
    (a) said annular clutch portion of said clutch assembly including first and second annular, radially-extending clutch plates disposed adjacent, and adapted for viscous clutching co-action with an adjacent surface of said first and second annular side wall members, respectively;
    (b) said first and second clutch plates being drivingly associated with said axially-extending clutch hub portion, whereby rotation of said clutch plates results in rotation of said clutch hub portion;
    (c) said annular housing assembly further comprising an annular radially-extending housing plate disposed axially between said first and second clutch plates, and adapted for viscous clutching co-action with at least one of said first and second clutch plates; and
    (d) said housing plate including a first plurality of portions in operable engagement with said first annular side wall member, and a second plurality of portions in operable engagement with said second annular side wall member, said first and second pluralities of portions being disposed within said annular viscous chamber.

2. A viscous coupling as claimed in claim 1, characterized by said first and second annular side wall members and said housing plate comprising metal stampings.

3. A viscous coupling as claimed in claim 1, characterized by said first and second plurality of portions being disposed radially outward of said first and second clutch plates.

4. A viscous coupling as claimed in claim 1, characterized by said housing plate comprising a metal stamping and said first and second plurality of portions comprising tab portions extending generally axially toward said first and second annular side wall members, respectively.

5. A viscous coupling as claimed in claim 4, characterized by the axial dimensions of said first and second pluralities of tab portions being selected such that said housing plate is prevented from substantial axial movement relative to said first and second annular side wall members.

6. A viscous coupling as claimed in claim 1, characterized by one of said first and second annular side wall members including means operable, in cooperation with its respective plurality of portions to prevent substantial rotation of said housing plate.

7. A viscous coupling as claimed in claim 4, characterized by said first annular side wall member defining a plurality of generally radially-extending recesses, and one of said first plurality of tab portions being disposed in each of said radially-extending recesses, to prevent substantial rotation of said housing plate.

8. A viscous coupling as claimed in claim 1, characterized by said housing plate being adapted for viscous clutching co-action with both of said first and second clutch plates.

9. A viscous coupling as claimed in claim 1, characterized by said annular clutch assembly including a radially-extending hub portion drivingly associated with said axially-extending clutch hub portion, said first and second clutch plates being drivingly associated with said radially-extending hub portion.

10. A viscous coupling for transmitting torque between an outer housing (H) and an input-output shaft (S); said viscous coupling being of the type including an annular housing assembly including means adapted for operable engagement with the outer housing (H), said annular housing assembly having axially-spaced, radially-extending first and second annular side wall members defining an annular viscous chamber therebetween adapted to contain viscous fluid; an annular clutch assembly disposed within said viscous chamber and including an annular, radially-extending clutch portion adapted for viscous clutching co-action with one of said first and second side wall members, and an axially-extending clutch hub portion adapted to be drivingly associated with the input-output shaft (S), characterized by:
    (a) said annular clutch portion of said clutch assembly including a plurality $N+1$ of annular, radially-extending clutch plates, each of said clutch plates disposed adjacent, and adapted for viscous clutching co-action with at least one adjacent surface of said annular housing assembly;
    (b) each of said plurality of clutch plates being drivingly associated with said axially-extending clutch hub portion, whereby rotation of said clutch plates results in rotation of said clutch hub portion;
    (c) said annular housing assembly further comprising N annular radially-extending housing plates, each of said housing plates being disposed axially between a pair of adjacent ones of said plurality $N+1$ of clutch plates, and adapted for viscous clutching co-action therewith; and
    (d) a first housing plate including a first plurality of portions in operable engagement with said first annular side wall member; and an Nth housing plate including a second plurality of portions in operable engagement with said second annular side wall member, said first and second pluralities of portions being disposed within said annular viscous chamber.

11. A viscous coupling as claimed in claim 10, characterized by said first and second annular side wall members and said N housing plates comprising metal stampings.

12. A viscous coupling as claimed in claim 10, characterized by said first and second pluralities of portions being disposed radially outward of said plurality N+1 of clutch plates.

13. A viscous coupling as claimed in claim 10, characterized by said N housing plates comprising metal stampings, and said first and second pluralities of portions comprising tab portions extending generally axially toward said first and second annular side wall members, respectively.

14. A viscous coupling as claimed in claim 10, characterized by one of said first and second annular side wall members including means operable, in cooperation with its respective plurality of portions to prevent substantial rotation of said housing plate.

15. A viscous coupling as claimed in claim 10, characterized by said annular clutch assembly including a radially-extending hub portion drivingly associated with said axially-extending clutch hub portion, each of said plurality of N+1 of said clutch plates being drivingly associated with said radially-extending hub portion.

16. A viscous coupling as claimed in claim 10, characterized by said first and second side wall members, said N housing plates, and said plurality N+1 of clutch plates comprising metal stampings.

17. A method of assembling and filling a viscous fluid coupling including first and second annular side wall members, said first side wall member having a reservoir-defining portion and said second side wall member having a radially outer peripheral portion; an annular clutch assembly including an axially-extending clutch hub portion and first and second clutch plates drivingly associated with said clutch hub portion; said viscous fluid coupling further including an annular radially-extending housing plate disposed axially between said first and second clutch plates for viscous clutching co-action therewith in response to the presence of viscous fluid, said housing plate including a first plurality of portions and a second plurality of portions, the method comprising:
(a) positioning said first side wall member with said reservoir-defining portion oriented downwardly;
(b) locating said clutch hub portion in sealing engagement with said reservoir-defining portion of said first side wall member;
(c) positioning said first clutch plate onto said first side wall member, and in driving engagement with said clutch hub portion;
(d) positioning said housing plate above said first clutch plate with said first plurality of portions in engagement with said first side wall member;
(e) positioning said second clutch plate onto said housing plate, and in driving engagement with said clutch hub portion;
(f) subsequent to step (b), introducing a predetermined volume of viscous fluid into said reservoir-defining portion of said first side wall member;
(g) positioning said second side wall member above said second clutch plate, in sealing engagement with said clutch hub portion, in engagement with said second plurality of portions, and with said outer peripheral portion of said second side wall member in engagement with said first side wall member.

18. A method as claimed in claim 17, characterized by said steps (d) and (e) being performed in order, with said first clutch plate, said housing plate, and said second clutch plate comprising a subassembly, and further comprising the step of positioning said subassembly in driving engagement with said clutch hub portion.

19. A method as claimed in claim 18, characterized by performing said steps (d) and (e), to comprise said subassembly being done before said step (c).

20. A viscous coupling for use as a bypass element in a torque converter assembly (T) including a torque converter housing (H) and an output shaft (S); said viscous coupling being of the type including an annular housing assembly adapted to be positioned within the torque converter housing, and having axially spaced, radially-extending first and second annular side wall members defining an annular viscous chamber therebetween adapted to contain viscous fluid; said annular housing assembly defining a radially-extending annular clutching surface adapted for clutching co-action with a confronting surface of the torque converter housing (H); an annular clutch assembly disposed within said viscous chamber and including an annular, radially-extending clutch portion adapted for viscous clutching co-action with one of said first and second side wall members, and an axially-extending clutch hub portion adapted to be drivingly associated with the output shaft (S) of the torque converter assembly; characterized by:
(a) said annular clutch portion of said clutch assembly including first and second annular, radially-extending clutch plates disposed adjacent, and adapted for viscous clutching co-action with adjacent surfaces of said housing assembly;
(b) said first and second clutch plates being drivingly associated with said axially-extending clutch hub portion, whereby rotation of said clutch plates results in rotation of said clutch hub portion;
(c) said coupling further including an annular, radially-extending housing plate disposed axially between said first and second clutch plates, and adapted for viscous clutching co-action with both of said first and second clutch plates; and
(d) at least one of said housing assembly and said housing plate including a plurality of axially-extending portions, disposed in said viscous chamber, and in operable engagement the other of said housing assembly and said housing plate, whereby said housing plate is fixed to rotate with said housing assembly.

21. A viscous coupling as claimed in claim 20, characterized by said plurality of axially-extending portions being disposed radially outward of said first and second clutch plates.

22. A viscous coupling as claimed in claim 20, characterized by said housing plate comprising a metal stamping, and said plurality of axially-extending portions comprising tab portions defined by said housing plate and extending toward one of said first and second annular sidewall members.

23. A viscous coupling as claimed in claim 20, characterized by the axial dimensions of said axially-extending portions being selected such that said housing plate is prevented from substantial axial movement relative to said housing assembly.

* * * * *